US010007922B2

(12) United States Patent
Maw

(10) Patent No.: US 10,007,922 B2
(45) Date of Patent: *Jun. 26, 2018

(54) OPT IN SYSTEM AND METHOD

(71) Applicant: VISA U.S.A. INC., San Francisco, CA (US)

(72) Inventor: Brian Jeffrey Maw, Belmont, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/006,925

(22) Filed: Jan. 26, 2016

(65) Prior Publication Data

US 2016/0140598 A1    May 19, 2016

Related U.S. Application Data

(63) Continuation of application No. 14/690,300, filed on Apr. 17, 2015, now Pat. No. 9,275,397, which is a
(Continued)

(51) Int. Cl.
*G06K 5/00* (2006.01)
*G06Q 30/02* (2012.01)
(Continued)

(52) U.S. Cl.
CPC ........ *G06Q 30/0226* (2013.01); *G06Q 20/204* (2013.01); *G06Q 20/34* (2013.01);
(Continued)

(58) Field of Classification Search
CPC ........ G07F 7/08; G07F 7/1008; G06Q 20/341
(Continued)

(56) References Cited

U.S. PATENT DOCUMENTS 5,473,143 A    12/1995 Vak et al.
6,014,635 A    1/2000 Harris et al.
(Continued)

FOREIGN PATENT DOCUMENTS

KR    101024810    3/2011
KR    1020110019887    3/2011
(Continued)

OTHER PUBLICATIONS

International Patent Application PCT/US2012/046644, International Search Report and Written Opinion, dated Jan. 21, 2013.
(Continued)

*Primary Examiner* — Daniel St. Cyr
(74) *Attorney, Agent, or Firm* — The Webb Law Firm

(57) ABSTRACT

A financial transaction system includes a computer readable storage medium and a processor in communication with the computer readable storage medium. The processor is configured to receive a financial transaction request message from a payment device reader, and parse the financial transaction request message. The financial transaction request message includes a cardholder response to an offer to enroll in a loyalty program of a commercial entity. The processor is further configured to store the cardholder response in the computer readable storage medium.

20 Claims, 6 Drawing Sheets

Related U.S. Application Data continuation of application No. 14/035,685, filed on Sep. 24, 2013, now Pat. No. 9,010,632, which is a continuation of application No. 12/352,420, filed on Jan. 12, 2009, now Pat. No. 8,556,169.

(51) Int. Cl.
  *G06Q 20/34* (2012.01)
  *G06Q 20/20* (2012.01)
  *G06Q 20/40* (2012.01)

(52) U.S. Cl.
  CPC ......... *G06Q 20/3574* (2013.01); *G06Q 20/40* (2013.01); *G06Q 20/409* (2013.01); *G06Q 30/02* (2013.01); *G06Q 30/0238* (2013.01)

(58) Field of Classification Search
  USPC ........ 235/375, 379, 380, 383; 705/1.1, 14.1, 705/14.27, 14.3
  See application file for complete search history.

(56) References Cited

U.S. PATENT DOCUMENTS

| | | | |
|---|---|---|---|
| 6,973,172 B1 | 12/2005 | Bitove et al. | |
| 7,039,600 B1 * | 5/2006 | Meek | G06Q 20/1085 235/379 |
| 7,395,212 B2 * | 7/2008 | Juneau | G06Q 30/016 705/1.1 |
| 7,680,688 B2 * | 3/2010 | Hessburg | G06Q 10/02 705/14.33 |
| 7,686,218 B2 * | 3/2010 | Hessburg | G06Q 10/02 235/383 |
| 7,779,160 B1 * | 8/2010 | Symonds | G06Q 20/10 705/21 |
| 7,828,206 B2 * | 11/2010 | Hessburg | G06Q 10/02 235/380 |
| 7,844,512 B2 * | 11/2010 | Richards | G06F 3/023 705/34 |
| 8,046,256 B2 * | 10/2011 | Chien | G06Q 20/04 705/14.33 |
| 8,474,701 B1 * | 7/2013 | Meek | G06Q 20/1085 235/379 |
| 8,556,169 B2 * | 10/2013 | Maw | G06Q 20/3574 235/380 |
| 9,010,632 B2 * | 4/2015 | Maw | G06Q 20/3574 235/380 |
| 9,275,397 B2 * | 3/2016 | Maw | G06Q 30/0226 |
| 2002/0026348 A1 | 2/2002 | Fowler et al. | |
| 2002/0117544 A1 | 8/2002 | Wolf et al. | |
| 2003/0233251 A1 | 12/2003 | Haskell et al. | |
| 2004/0220876 A1 | 11/2004 | Liu | |
| 2005/0075932 A1 | 4/2005 | Mankoff | |
| 2005/0210240 A1 | 9/2005 | Barron | |
| 2006/0131390 A1 | 6/2006 | Kim | |
| 2006/0277103 A1 | 12/2006 | Fujita et al. | |
| 2007/0022048 A1 | 1/2007 | Kingsborough et al. | |
| 2008/0040270 A1 | 2/2008 | Buchheit et al. | |
| 2008/0109335 A1 | 5/2008 | Keohane et al. | |
| 2008/0120214 A1 | 5/2008 | Steele et al. | |
| 2008/0133351 A1 | 6/2008 | White et al. | |
| 2008/0147496 A1 | 6/2008 | Bal et al. | |
| 2008/0150678 A1 | 6/2008 | Giobbi et al. | |
| 2008/0217397 A1 | 9/2008 | Degliantoni et al. | |
| 2008/0228563 A1 | 9/2008 | Zellner et al. | |
| 2008/0262935 A1 | 10/2008 | Baumgartner et al. | |
| 2009/0006203 A1 | 1/2009 | Fordyce, III et al. | |
| 2009/0271262 A1 | 10/2009 | Hammad | |
| 2009/0276305 A1 | 11/2009 | Clopp | |
| 2010/0030688 A1 | 2/2010 | Patterson | |
| 2010/0125737 A1 | 5/2010 | Kang | |
| 2010/0161404 A1 | 6/2010 | Taylor et al. | |
| 2010/0176193 A1 | 7/2010 | Maw | |
| 2010/0268588 A1 | 10/2010 | Lal et al. | |
| 2010/0274691 A1 | 10/2010 | Hammad et al. | |
| 2010/0274853 A1 | 10/2010 | Carlson et al. | |
| 2010/0312692 A1 | 12/2010 | Teicher | |
| 2011/0016050 A1 | 1/2011 | Evans | |
| 2011/0066483 A1 | 3/2011 | Salmon et al. | |
| 2011/0087531 A1 | 4/2011 | Winters et al. | |
| 2011/0125565 A1 | 5/2011 | MacIlwaine et al. | |
| 2011/0153406 A1 | 6/2011 | Mackin et al. | |
| 2011/0153438 A1 | 6/2011 | Dragt | |
| 2011/0202402 A1 | 8/2011 | Fowler et al. | |
| 2011/0238483 A1 | 9/2011 | Yoo et al. | |
| 2012/0089461 A1 | 4/2012 | Greenspan | |
| 2012/0109730 A1 | 5/2012 | Yoder et al. | |
| 2012/0185315 A1 | 7/2012 | VonDerheide et al. | |
| 2013/0024307 A1 | 1/2013 | Fuerstenberg et al. | |
| 2013/0124360 A1 | 5/2013 | Mitrovic | |
| 2013/0181045 A1 | 7/2013 | Dessert et al. | |
| 2013/0282461 A1 | 10/2013 | Ovick et al. | |
| 2014/0025472 A1 | 1/2014 | Maw | |
| 2014/0222533 A1 | 8/2014 | Ovick et al. | |
| 2015/0220960 A1 | 8/2015 | Maw | |

FOREIGN PATENT DOCUMENTS

| | | |
|---|---|---|
| WO | 2008098004 | 8/2008 |
| WO | 2013158861 | 10/2013 |

OTHER PUBLICATIONS

International Patent Application PCT/US2013/037141, International Search Report and Written Opinion, dated Jul. 24, 2013.
International Patent Application PCT/US12/46644, International Preliminary Report on Patentability, dated Jan. 23, 2014.

* cited by examiner

OPT IN SYSTEM AND METHOD

RELATED APPLICATIONS

The present application is a continuation application of U.S. patent application Ser. No. 14/690,300, filed on Apr. 17, 2015, entitled "Opt in System and Method", and issued as U.S. Pat. No. 9,275,397 on Mar. 1, 2016, which is a continuation application of U.S. patent application Ser. No. 14/035,685, filed on Sep. 24, 2013, entitled "Opt in System and Method", and issued as U.S. Pat. No. 9,010,632 on Apr. 21, 2015, which is a continuation application of U.S. patent application Ser. No. 12/352,420, filed on Jan. 12, 2009, issued as U.S. Pat. No. 8,556,169 on Oct. 15, 2013, and entitled "Opt in System and Method," the entire disclosures of which applications are incorporated herein by reference.

FIELD OF THE TECHNOLOGY

The disclosed system and method relate to financial transaction systems. More specifically, the disclosed system and method relate to systems for opting into non-financial programs at a point of sale.

BACKGROUND

Financial transactions that use payment devices, such as credit cards, are commonly used. Merchants and payment device issuers, e.g., commercial banks, frequently offer rewards or loyalty programs associated with use of the payment devices. To participate in many of these loyalty and rewards programs, a customer must be aware that such loyalty or awards programs exist, and the customer is required to complete and submit paperwork to the merchant or issuer, or subscribe while on a phone call with one of the parties. Accordingly, many customers do not take advantage of the loyalty or rewards programs that are available to them and thus miss out on opportunities to save money by receiving coupons for free or discounted merchandise.

A system and method that provides cardholders enhanced capabilities to participate in loyalty or rewards programs and take advantage of special offers is desirable.

SUMMARY OF THE DESCRIPTION

In some embodiments, a financial transaction system includes a computer readable storage medium and a processor in communication with the computer readable storage medium. The processor configured to receive a financial transaction request message from a payment device reader, and parse the financial transaction request message. The financial transaction request message including a cardholder response to an offer to enroll in a loyalty program of a commercial entity. The processor is further configured to store the cardholder response in the computer readable storage medium.

In some embodiments, a system for use in performing a financial transaction includes a computer readable storage medium and a processor in communication with the computer readable storage medium. The processor is configured to receive data from a payment device, receive a cardholder's response to an offer to enroll in a loyalty program of a commercial entity, and transmit a financial transaction authorization request message. The financial transaction authorization message includes data representative of the cardholder's response and the data received from the payment device.

In some embodiments, a method for performing a transaction includes receiving a financial transaction request message from a payment device reader and parsing the financial transaction request message. The financial transaction request message including a cardholder response to an offer to enroll in a loyalty program of a commercial entity. The method includes storing the cardholder response in the computer readable storage medium.

In some embodiments, a method includes receiving data from a payment device, receiving a cardholder's response to an offer to enroll in a loyalty program of a commercial entity, and transmitting a financial transaction authorization request message. The financial transaction authorization message includes data representative of the cardholder's response and the data received from the payment device.

BRIEF DESCRIPTION OF THE DRAWINGS

FIG. 3 is a block diagram illustrating a data field that may be stored on a payment device illustrated in FIG. 1.

FIG. 4 is a block diagram of a Tag-Length-Value (TLV) format of a data field as shown in FIG. 3.

DETAILED DESCRIPTION

Figure 1:
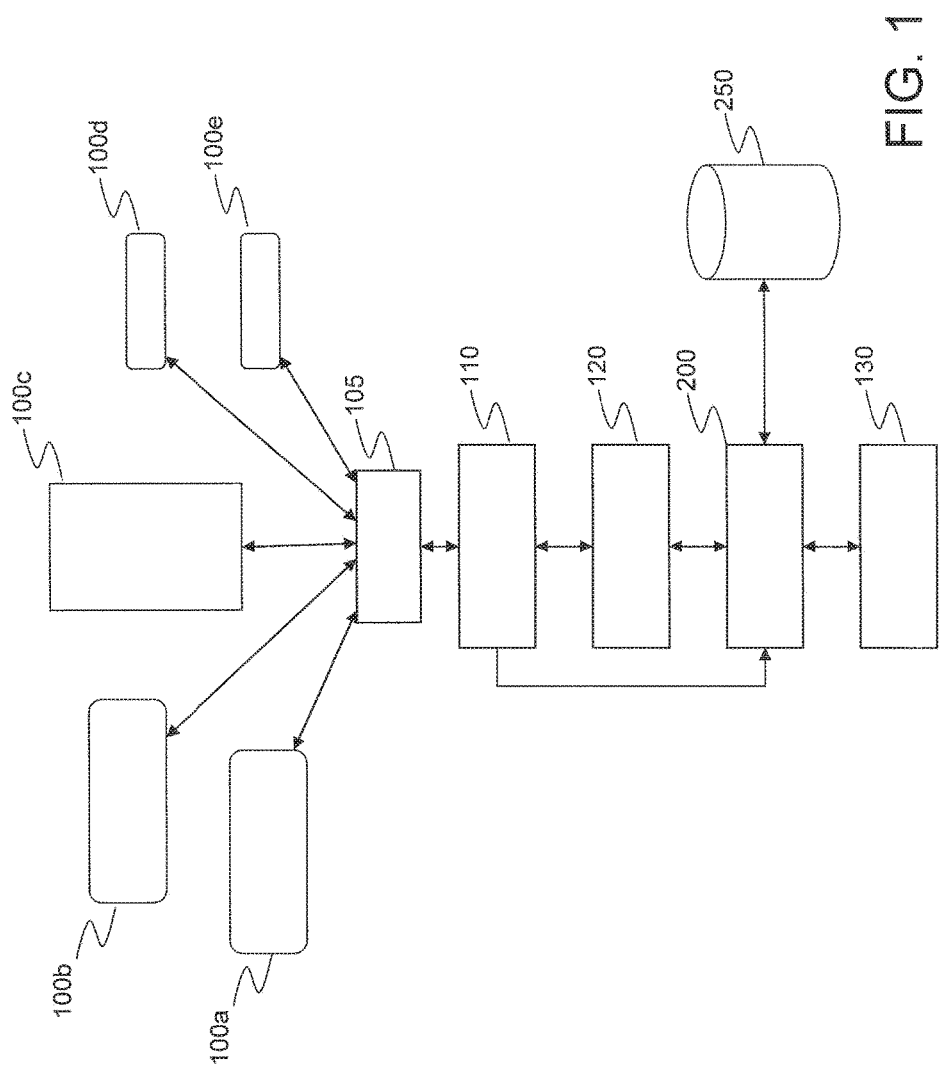
FIG. 1 is a block diagram of one embodiment of a system for performing a financial transaction.
Figure 5:
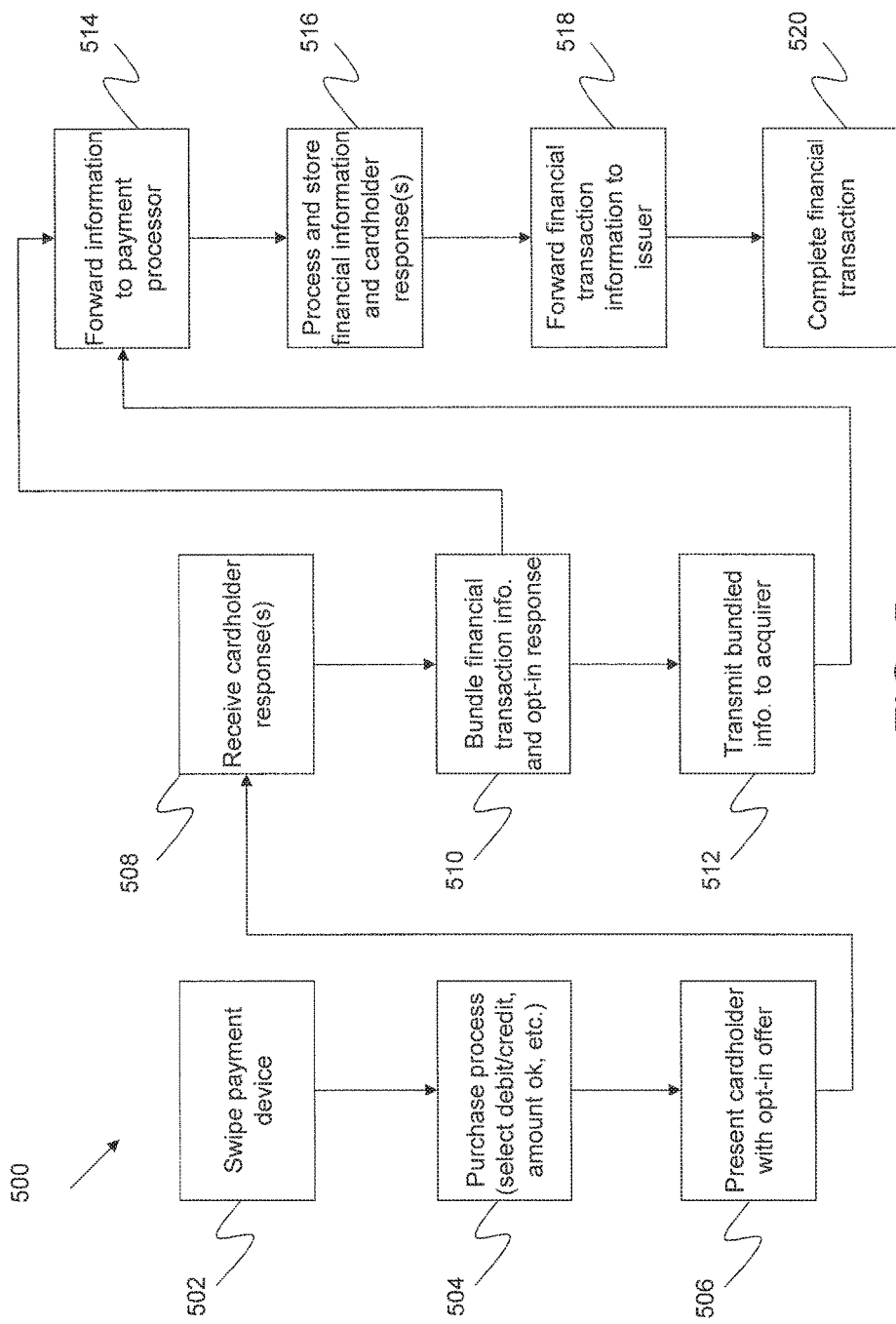
FIG. 5 is a flow diagram of data moving through the financial transaction network illustrated in FIG. 1.

With reference to FIGS. 1 and 5, one example of a system and method involving a payment device 100 allowing a cardholder to opt into a loyalty or rewards program associated with financial transactions is now described. FIG. 1 illustrates one example of a system configured to perform a financial transaction, and FIG. 5 is a flow chart describing the flow of data through the system illustrated in FIG. 1.

As shown in FIG. 1, a payment device 100 may be any credit, debit, or prepaid device that may be used in a financial transaction. Examples of a payment device include, but are not limited to, a standard credit/debit card 100*a*, a radio frequency (also known as "contactless" or "PAY WAVE™") payment device 100*b*, a mobile phone device 100*c*, a mini-card 100*d*, micro tag 100*e*, payment fob, or any other payment device that may be used to perform a financial transaction and store customer exclusive non-financial data. The term payment device 100 is used below to refer to any of the devices 100*a*-100*e*. As used herein, acquirer 120 refers to one or more computer processors or networks owned and/or operated by an acquirer entity. The payment processor 200 refers to one or more computer processors or networks owned and/or operated by a payment processing entity (such as the "VISANET" network operated by VISA, Inc. of Foster City, Calif.). The issuer 130 refers to one or more computer processors or networks owned or operated by an issuer financial institution. Thus, blocks 110, 120, 200 and 130 include particular machines coupled to each other directly or indirectly by one or more communications networks.

Figure 2:
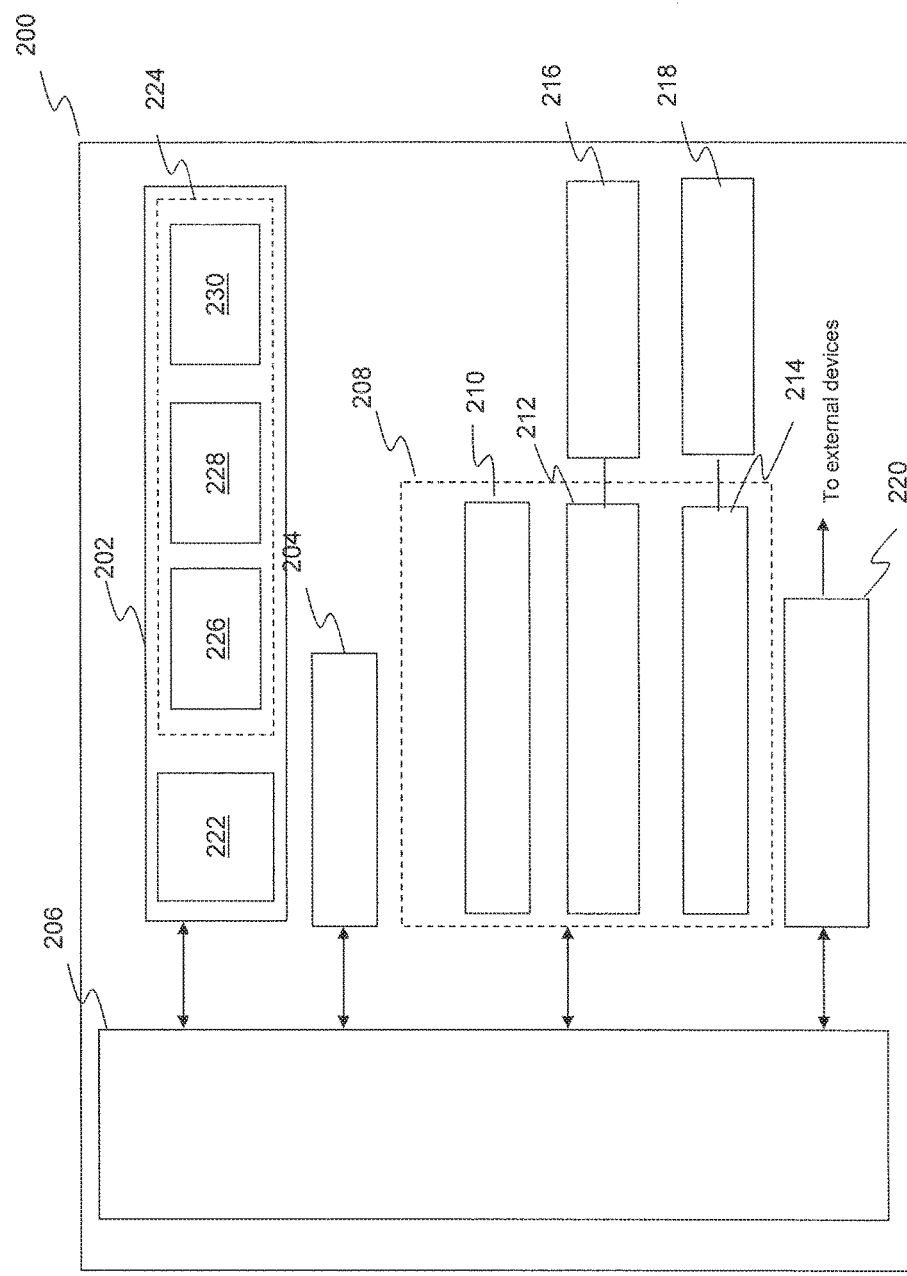
FIG. 2 is a block diagram of an exemplary architecture of a payment processing system as illustrated in FIG. 1.

FIG. 2 is a block diagram of one example of a payment processor 200. Payment processor 200 may be any payment network including, but not limited to, the, "VISANET™", network operated by Visa, Inc. of Foster City, Calif. The payment processor 200 is configured to parse or use the data stored on the payment device/card 100 in a financial transaction and a non-financial transaction.

Payment processor 200 may be a server, computer, or any device or group of devices that may be configured to transmit, receive, and/or store financial transaction data. As shown in FIG. 2, payment processor 200 may include one or more processors 202, which may be connected to a wired or wireless communication infrastructure 206 (e.g., a communications bus, cross-over bar, local area network (LAN), or wide area network (WAN)). Processor(s) 202 may be any central processing unit, microprocessor, micro-controller, computational device, or like device that has been programmed to form a special purpose processor for performing the payment processor functions. In some embodiments, processor(s) 202 may be functionally comprised of a data processor 222 and a fraud prevention engine 224. Fraud prevention engine 224 may further include a data parser 226, a form factor identifier 228, and a customer data manager 230. These structures may be implemented as hardware, firmware, or software encoded on a computer readable medium, such as main memory 204 or secondary memory 208, which may be accessed by processor(s) 202.

Main memory 204 may be a local or working memory such as a random access memory (RAM). Secondary memory 208 may be a more persistent memory than main memory 204. Examples of secondary memory 208 include, but are not limited to, a hard disk drive 210 and/or removable storage drive 212, representing a floppy disk drive, a magnetic tape drive, an optical disk drive, or the like. The removable storage drive 212 may read from and/or write to a removable storage unit 216. Removable storage unit 216 may be a floppy disk, magnetic tape, CD-ROM, DVD-ROM, optical disk, ZIP™ drive, blu-ray disk, and the like, which may written to and/or read by removable storage drive 212.

In some embodiments, secondary memory 208 may include other similar devices for allowing computer programs or other instructions to be loaded into payment processor 200 such as a removable storage device 218 and an interface 214. An example of such a removable storage device 218 and interface 214 includes, but is not limited to, a USB flash drive and associated USB port, respectively. Other removable storage devices 218 and interfaces 214 that allow software and data to be transferred from the removable storage device 218 to payment processor 200 may be used.

Payment processor 200 may also include a communications interface 220. Communications interface 220 allows software and data to be transferred between payment processor 200 and external devices, e.g., devices residing at a location of an issuer 130, acquirer 120, merchant 110, a third-party processing system, or the like. Examples of communications interface 220 may include a modem, a network interface (such as an Ethernet or wireless network card), a communications port, a Personal Computer Memory Card International Association (PCMCIA) slot and card, or the like. Software and data transferred via communications interface 220 are in the form of signals which may be electronic, electromagnetic, optical, or any other signal capable of being received by communications interface 220. These signals are provided to communications interface 220 via a communications path or channel. The path or channel that carries the signals may be implemented using wire or cable, fiber optics, a telephone line, a cellular link, a radio frequency (RF) link, or the like.

A financial transaction may be any operation involving a payment device 100, whether a payment, reimbursement, or any other interaction using a payment device 100. Financial transactions may include credit, debit, payroll, or charge transactions.

Payment devices 100 may include various types of stored information. FIG. 3 depicts a data field 55 (also referred to as "Field 55"), which is a memory field on payment device 100 that may be configured to store financial and non-financial information. In some embodiments, the memory field is stored in a computer chip within payment device 100. Although implementations of Field 55 may vary in storage size, in some embodiments the storage size may be limited to a maximum of 255 bytes of data. One of the features of Field 55 is the ability to allow unique personalization values to be included in the authorization messages. These values are also known as tags or data structures. Field 55 tags may include data embedded in the chip that an issuer 130 (e.g., a financial institution that issues a payment device 100 such as a bank or other commercial entity) requests to receive in an authorization message.

As shown in FIG. 3, in one embodiment of Field 55, the Field 55 data elements may include: an amount authorized 302, a random number 304, an application transaction counter (ATC) 306, issuer application data (IAD) 308, an application cryptogram 310, customer exclusive data 312, and a form factor identifier 314.

The customer exclusive data field 312 is now described in detail. Examples of the information or data that may be included in the customer exclusive data field 312 include, but are not limited to, loyalty or rewards program information and promotional deal information. The data in the customer exclusive data field 312 may be configured by a payment device reader 105 as described below.

The data stored in Field 55, including the customer exclusive data tag 312, may be stored in any format. In some embodiments, customer exclusive data tag 312 and other data fields are stored in Tag-Length-Value (TLV) format. FIG. 4 illustrates one embodiment of a TLV format. The tag field 402 identifies the position of the information, the length field 404 identifies the length of the information, and value field 406 carries the payload data.

FIG. 5 is a flow chart of one example of financial transaction flow. At block 502, a consumer or cardholder may use the payment device 100 at a payment device reader 105 (e.g., a magnetic swipe reader, contactless device reader, or the like) located at a merchant 110, kiosk (e.g., a ticketing kiosk), automated teller machine (ATM), gasoline pump, or anywhere else a payment device reader 105 may be located. The payment device reader 105 may include a user interface such as a display and a keypad or a touch screen display as well as a computer readable storage medium.

For example, a cardholder may swipe a credit/debit card 100a through a magnetic swipe reader or wave a contactless payment device 100b near a contactless payment device reader 105. The payment device reader 105 receives information from the payment device 100, which may include the information described above with respect to Field 55. The payment device reader 105 may locally store the information received from the payment device 100 in the computer readable storage medium.

At block 504, the cardholder may be queried by the payment device or terminal to identify the cardholder's zip code, phone number, to determine whether the amount to be charged is correct, or any other question that may be implemented in a payment device reader 105 to provide security to the cardholder as well as confirm the accuracy of the transaction. The cardholder may enter his or her responses using the keypad, touch screen, or other user interface provided by, or connected to, the payment device reader 105. In some embodiments a sales clerk or other employee of a merchant or service provider may enter the information for the cardholder.

At block 506, the cardholder is presented with one or more offers to opt-in to a rewards or loyalty program, or asked whether the cardholder would like to receive a special offer from a merchant 110, issuer 130, or other commercial entity. Examples of other commercial entities include, but are not limited to, banks, supermarkets, airlines, department stores, automobile manufacturers, restaurants, wholesalers, electronic stores, consumer websites, or the like. For example, a cardholder may be queried or prompted by the payment device reader 105 regarding whether he or she would like to join a rewards or loyalty program such as, for example, a frequent flier program, frequent shopper program, a frequent diner program, or any like program in which a commercial entity provides a discount or benefit to a customer for one-time (e.g., a coupon) or repeated business.

In some embodiments, the cardholder may be presented with a special offer or promotion that is currently offered by a merchant 110, acquirer 120 (e.g., a commercial bank), or other commercial entity. For example, a merchant 110 may partner with another merchant 110 or business in a cross-promotional deal. In this example, the cardholder may be asked if he or she would like a coupon for a discount on goods or services offered by the other business. If the cardholder answers in the affirmative, then the coupon may be printed along with the receipt for the current financial transaction.

In some embodiments, a cardholder may be presented with the option to change or confirm his or her home phone number, cellular phone number, billing address, or other personal information that is associated with the payment device account. One skilled in the art will understand that the number of queries and the types of programs or offers presented to the cardholder may be varied.

At block 508, the cardholder may enter his/her response(s) to the offer to opt into the rewards or loyalty program. The cardholder may enter the response using the touch screen display or keypad associated with the payment device reader 105. The payment device reader 105 may locally store the cardholder's response in a computer readable storage medium along with the information concerning the financial transaction. One skilled in the art will understand that the functions described with reference to blocks 506 and 508 may be performed before, during, or after the purchase process described above with reference to block 504.

At block 510, the payment device reader 105 may combine and format the financial transaction information and the cardholder's response(s) into TLV format or other format that may be included in an authorization message for performing a financial transaction. The authorization message is transmitted by the payment device reader 105 to an acquirer 120 at block 512. The acquirer 120 may obtain information from the issuer 130 of the payment device indicating whether the cardholder is credit worthy or if the payment device 100 has sufficient funds or credit to pay for the transaction. The acquirer 120 may then forward the details of the financial transaction to a payment processor 200. In some embodiments, payment device reader 105 may transmit the authorization messages directly to the payment processor 200 without sending the authorization messages to an acquirer 120.

At block 514, the payment processor 200 receives the authorization messages which may include the details of a financial transaction and the cardholders response(s) concerning opting into one or more rewards programs, loyalty programs, or to take advantage of a special discount or deal.

At block 516, the data parser 226 associated with the fraud prevention engine 224 parses and processes the financial information and/or the cardholder's opt in response(s) stored in the Field 55 data tags. For example, data parser 226 may separate the information concerning the financial transaction from the Field 55 data, which includes the opt-in response(s). In some embodiments, data parser 226 further performs editing, storage, distribution, monitoring, and reporting functions. For example, the Field 55 data may be stored in a computer readable storage medium such as main memory 204 or secondary memory 208 of payment processor 200. In some embodiments, the secondary memory 208 may include a cardholder database 250 that retains information concerning each cardholder serviced by payment processor 200, (e.g., each Visa cardholder).

At block 518, payment processor 200 forwards the parsed financial information to the payment card issuer 130 for processing. The issuer 130 will transmit a payment authorization response message to payment processor 200, which is then forwarded to payment device reader 105 either through acquirer 120 or directly to merchant 110 at block 520 where the financial transaction is completed. In some embodiments when the issuer 130 is unavailable to process the financial transaction, the payment processor 200 may process the transaction data on behalf of the issuer 130.

Figure 6:
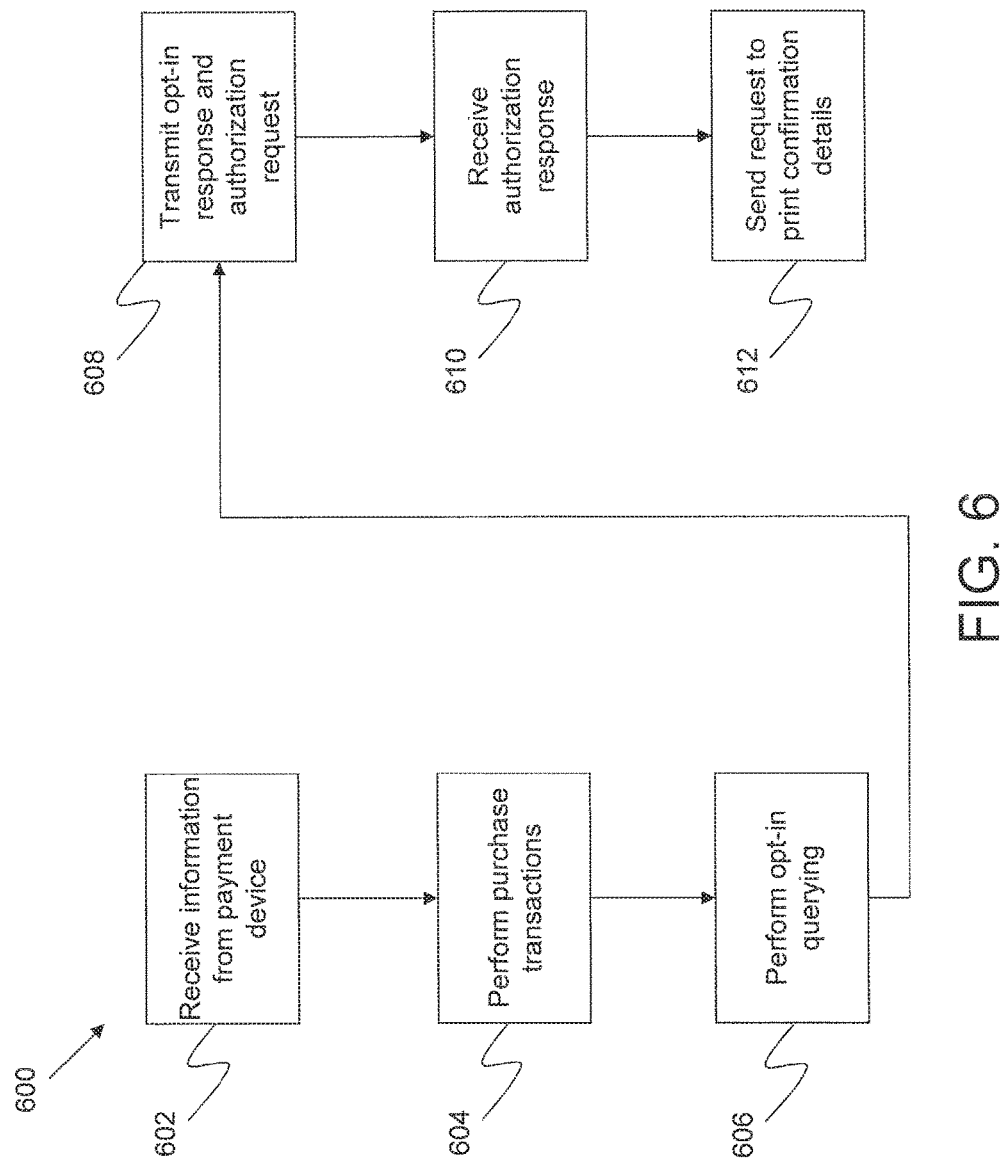
FIG. 6 is a flow diagram that may be performed by a payment device reader.

FIG. 6 is a flow diagram of a process 600 of opting into a promotional offer during a financial transaction. It is understood by one skilled in the art that process 600 may be performed at a point-of-sale (POS), e.g., a payment device reader 105 or terminal, located at a merchant 110 or other location such as a kiosk, ATM, or any location where a payment device reader 105 may be located.

As shown in FIG. 6, a payment device 100 is swiped or waved at a payment device reader 105 such that the payment device reader 105 receives the information stored on the payment device at block 602. At block 604, the purchase transaction is initiated and/or performed at the payment device reader 105. For example, the cardholder may be prompted by the payment device reader 105 to confirm or authorize the amount of the transaction, enter the cardholder's telephone number or zip code associated with the payment device 100, or any other information that is conventionally used for security or identification purposes. In response to these queries, the cardholder may enter his or her answers on a keypad, touch screen interface, or any other input device that may be connected to payment device reader 105.

At block 606, the payment device reader 105 may prompt a cardholder if he or she would like to take advantage of a special offer or opt into a rewards or loyalty program. For example, the payment device reader 105 may query if the cardholder would like to enroll in a frequent flier or shopper program or if the cardholder would like to receive a discount or coupon for a merchant. The payment device reader 105 may perform the querying by displaying the message on a monitor or display such as an LCD display that may be part of, or connected to, the payment device reader 105.

The cardholder may enter his or her response to the opt-in querying in the same manner in which the response(s) to the authorization or security questions are entered, e.g., by entering the response on a keypad, touch screen, or the like. In some embodiments, if the cardholder responds that he or she would like to enroll in a loyalty or rewards program, the cardholder may be asked to confirm that the personal information that is received from the payment device 100, e.g., customer exclusive data 312, is correct and that this information should be used to populate similar fields for the rewards or loyalty program. For example, the cardholder's telephone number, address, or other information that may be stored on payment device 100 may be used to automatically fill out a rewards or loyalty program application by payment device reader 105. One skilled in the art will appreciate that the opt-in querying may be performed before, during, or after the payment transaction performed at block 604.

At block 608, the payment device reader 105 may transmit a financial transaction authorization request message to an acquirer 120 or directly to a payment processor 200. The financial transaction authorization request message may have the cardholder's response to the opt-in querying embedded within the message. For example, the cardholder's response may be embedded within data received from Field 55 of the payment device 100.

At block 610, the payment device reader 105 receives a financial transaction response message from either an acquirer 120 or a payment processor 200. In some embodiments, the financial transaction response message may include cardholder-specific loyalty program data. For example, the financial transaction response message may include a confirmation number for the cardholder, a loyalty or rewards club membership number, or the like.

At block 612, the payment device reader 105 may display the cardholder-specific loyalty program data. For example, the payment device reader 105 may display the confirmation number or loyalty or rewards club membership number to the cardholder on the monitor attached to, or in communication with, the payment device reader 105. In some embodiments, the payment device reader 105 may cause a confirmation message or coupon to be printed along with the receipt for the financial transaction.

Figure 7:
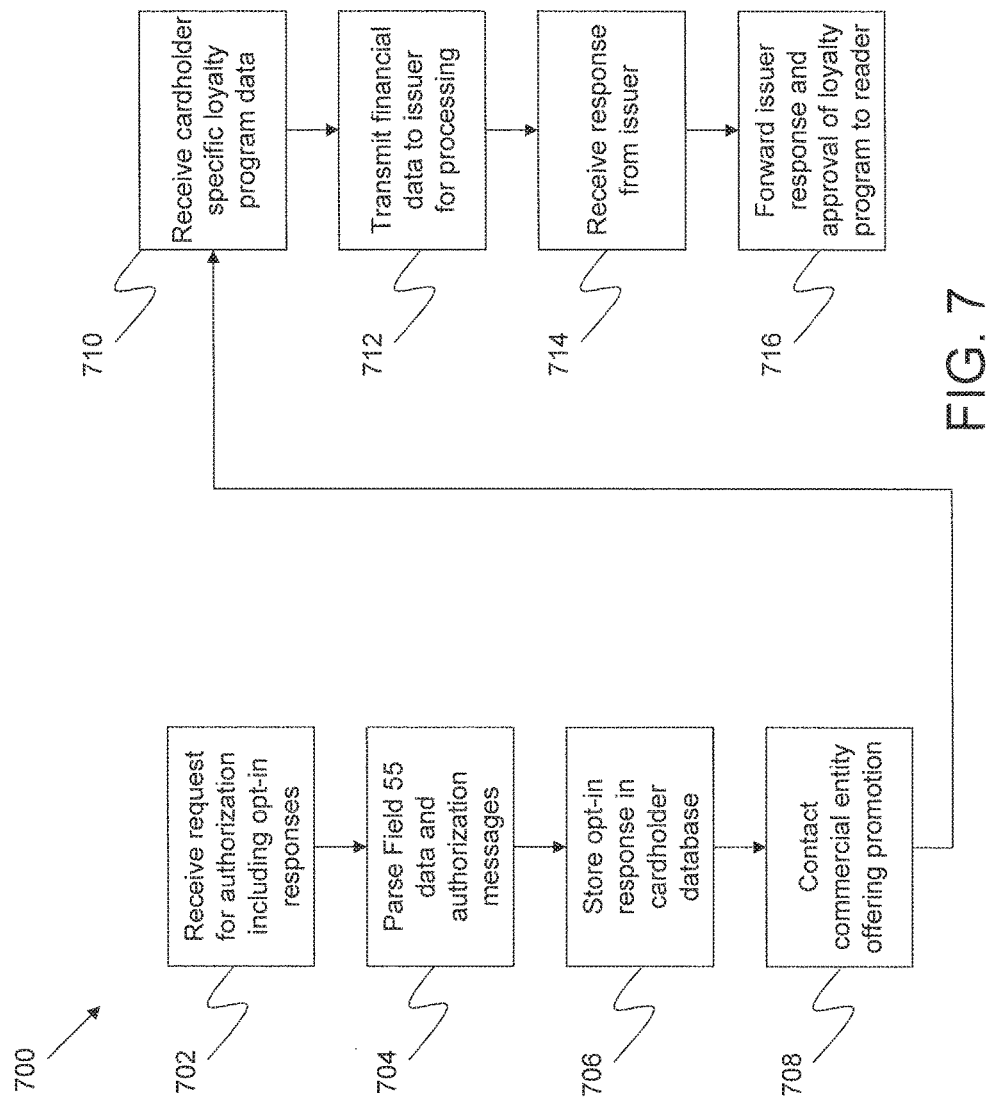
FIG. 7 is a flow diagram that may be performed by a payment processor as illustrated in FIG. 1.

FIG. 7 is a flow diagram of a process 700 of opting into a promotional offer during a financial transaction that may be performed by payment processor 200 in response to the process 600 performed by the payment device reader 105 described above.

As shown in FIG. 7, payment processor 200 receives a financial transaction authorization request message at block 702. As described above, the financial transaction authorization request message may include the cardholder's response to the opt-in querying embedded within the message.

At block 704, the data parser 226 of payment processor 200 parses the financial transaction authorization request message including the data stored in Field 55, which may include the cardholder's responses to the opt-in querying. The payment processor 200 may store the data related to the opt-in querying in a cardholder database 250 at block 706. As described above, the cardholder database 250, may be a main memory 204 or secondary memory 208 of payment processor 200 or it may be a separate computer readable storage medium remotely located from payment processor 200.

At block 708, payment processor 200 may contact the commercial entity offering the rewards program or promotional offer. For example, payment processor 200 may transmit a message to the commercial entity identifying that the cardholder accepted the offer to enroll into the loyalty or rewards program, or is interested in receiving whatever discount or promotional item was offered. Additionally, the payment processor 200 may include the cardholder's address, phone number, or other information that may be stored in the cardholder database that the commercial entity may use in enrolling the cardholder in the loyalty program.

At block 710, payment processor 200 may receive a confirmation message from the commercial entity. The confirmation message may identify that the cardholder has been successfully enrolled in the loyalty program. Additionally, the confirmation message may include cardholder-specific loyalty program data such as a membership number, confirmation number, or the like.

At block 712, payment processor 200 performs the financial transaction by transmitting a message to an issuer 130. At block 714, the payment processor 200 receives a response from the issuer 130 identifying if the financial transaction is approved or denied. One skilled in the art will understand that payment processor 200 may contact the commercial entity before, after, or while the payment processor 200 performs the financial transaction. Note that in some embodiments the issuer 130 may be unavailable to process the financial transactions, in which case the payment processor 200 may process the transaction data on behalf of the issuer 130 without transmitting and receiving messages from the issuer 130.

At block 716, the payment processor 200 transmits a financial transaction response message to either acquirer 120 or directly to payment device reader 105, which may be located at a merchant 110. In some embodiments, the financial transaction response message may include the cardholder-specific loyalty program data.

The present invention may be embodied in the form of computer-implemented processes and apparatus for practicing those processes. The present invention may also be embodied in tangible machine readable storage media encoded with computer program code, such as random access memory (RAM), floppy diskettes, read only memories (ROMs), CD-ROMs, hard disk drives, flash memories, or any other machine-readable storage medium, wherein, when the computer program code is loaded into and executed by a computer, the computer becomes a particular machine for practicing the invention. When implemented on a general-purpose processor, the computer program code segments configure the processor to create specific logic circuits. The invention may alternatively be embodied in a digital signal processor formed of application specific integrated circuits for performing a method according to the principles of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:
1. A method, comprising:
   reading, in a payment device reader of a transaction terminal, account information stored in a payment device of a user to generate a payment transaction;
   presenting, on a user interface device of the transaction terminal, an offer to enroll in a program offered by a commercial entity;
   receiving, in an input device coupled with the transaction terminal, a response to the offer to enroll in the program;
   bundling, by the transaction terminal, an authorization request for the payment transaction, the authorization request comprising:

the response to the offer to enroll in the program, and transaction information for a payment transaction in a payment account identified by the account information;

transmitting, by the transaction terminal, into a communication network the authorization request for the payment transaction to cause a data parser of a payment processor receiving the authorization request to separate the transaction information of the authorization request from the response to the offer to enroll in the program;

receiving, by the transaction terminal, a payment authorization response from the payment processor; and receiving, by the transaction terminal, enrollment information for the user of the payment account enrolling in the program, the enrollment information received from the commercial entity via the payment processor.

2. The method of claim 1, wherein the authorization request is configured to cause the payment processor to:
retrieve cardholder-specific data from a storage medium accessible, in response to the response, bundled in the authorization request, to the offer to enroll in the program of a commercial entity;
transmit the cardholder-specific data to the commercial entity; and
receive a message from the commercial entity, the message comprising cardholder-specific loyalty program data.

3. The method of claim 2, wherein the authorization request is further configured to cause the payment processor to:
transmit, to the transaction terminal via the communication network, an authorization response for the authorization request, the authorization response includes the cardholder-specific loyalty program data.

4. The method of claim 3, wherein the cardholder-specific loyalty program data includes a loyalty program rewards membership number.

5. The method of claim 3, further comprising:
displaying, on a monitor of the transaction terminal, the cardholder-specific loyalty program data received in the transaction terminal via the authorization response.

6. The method of claim 3, further comprising:
printing, on a printer coupled with the transaction terminal, the cardholder-specific loyalty program data received in the transaction terminal via the authorization response.

7. The method of claim 1, further comprising:
receiving, in the user interface, contact information of the user prior to presenting, on the user interface, the offer to enroll in the program;
presenting, in the user interface, personal information of the user for confirmation;
receiving, in the user interface, a confirmation of the personal information for enrolling in the program; and
providing, in the authorization request, the personal information.

8. A transaction terminal, comprising:
a payment device reader configured to read account information stored in a payment device of a user;
a user interface device configured to present an offer to enroll in a program offered by a commercial entity;
an input device configured to receive a response to the offer to enroll in the program,
wherein the transaction terminal is configured to bundle an authorization request for a payment transaction in a payment account identified by the account information, the authorization request comprising:
the response to the offer to enroll in the program, and transaction information for a payment transaction in a payment account identified by the account information; and
a communication device configured to transmit into a communication network the authorization request for the payment transaction, the authorization request causing a data parser of a payment processor configured on the communication network to receive the authorization request and to separate the transaction information of the authorization request from the response to the offer to enroll in the program;
wherein the transaction terminal is further configured to:
receive a payment authorization response from the payment processor; and
receive enrollment information for the user of the payment account enrolling in the program, the enrollment information received from the commercial entity via the payment processor.

9. The transaction terminal of claim 8, wherein the authorization request is configured to cause the computer to:
retrieve cardholder-specific data from a storage medium accessible, in response to the response, bundled in the authorization request, to the offer to enroll in the program of a commercial entity;
transmit the cardholder-specific data to the commercial entity; and
receive a message from the commercial entity, the message comprising cardholder-specific loyalty program data.

10. The transaction terminal of claim 9, wherein the authorization request is further configured to cause the computer to:
transmit, to the transaction terminal via the communication network, an authorization response for the authorization request, the authorization response includes the cardholder-specific loyalty program data.

11. The transaction terminal of claim 10, wherein the cardholder-specific loyalty program data includes a loyalty program rewards membership number.

12. The transaction terminal of claim 10, wherein the user interface is further configured to display the cardholder-specific loyalty program data received in the transaction terminal via the authorization response.

13. The transaction terminal of claim 10, further comprising:
a printer configured to print the cardholder-specific loyalty program data received in the transaction terminal via the authorization response.

14. The transaction terminal of claim 8, wherein the user interface is further configured to
receive contact information of the user prior to presenting, on the user interface, the offer to enroll in the program;
present personal information of the user for confirmation;
receive a confirmation of the personal information for enrolling in the program; and
wherein the transaction terminal is configured to provide, in the authorization request, the personal information.

15. A non-transitory computer readable medium storing instructions configured to instruct a transaction terminal to perform a method, the method comprising:
reading, by a data reading device of the transaction terminal, account information from a payment device of a user;

presenting, in a user interface device of the transaction terminal, an offer to the user to enroll in a program offered by a commercial entity;

receiving, in an input device of the transaction terminal from the user, a response to the offer;

transmitting, using a communication device of the transaction terminal over a communication network and by a way of being embedded in an authorization request generated by the reader for a payment transaction in a payment account identified by the account information, the response to the offer to enroll in the program and transaction information for the payment transaction;

wherein being embedded in the authorization request for the payment transaction and received via the input device, the response to the offer to enroll in the program causes a data parser of a computing device connected to the communication network and comprising a payment processor to receive the authorization request and to separate the transaction information of the authorization request from the response to the offer to enroll in the program;

receiving, by the transaction terminal, a payment authorization response from the payment processor; and receiving, by the transaction terminal, enrollment information for the user of the payment account enrolling in the program, the enrollment information received from the commercial entity via the payment processor.

16. The non-transitory computer readable medium of claim 15, wherein the instructions are further configured to instruct the transaction terminal to receive a communication from the computing device over the communication network and display on the user interface device the communication related to the offer to enroll in the program.

17. The non-transitory computer readable medium of claim 15, wherein the response includes user-specific data provided by the user via the input device.

18. The non-transitory computer readable medium of claim 17, wherein the offer is presented to enroll in the program in response to reading the account information from the payment device of the user.

19. The non-transitory computer readable medium of claim 17, wherein the method further comprises:
receiving an authorization response for the payment transaction;
extracting from the authorization response for the payment transaction user-specific loyalty program data; and
presenting via the user interface device to the user the user-specific loyalty program data.

20. The non-transitory computer readable medium of claim 19, wherein the user-specific loyalty program data includes a loyalty program rewards membership number.

* * * * *